June 28, 1960  J. D. BALL  2,943,262
PULSE ANALYZER
Filed Oct. 28, 1957  2 Sheets-Sheet 1

INVENTOR.
JOHN D. BALL,
BY Frank S. Troidl
ATTORNEY.

June 28, 1960     J. D. BALL     2,943,262
PULSE ANALYZER

Filed Oct. 28, 1957     2 Sheets-Sheet 2

INVENTOR.
JOHN D. BALL,
BY Frank S. Triedl
ATTORNEY.

United States Patent Office 2,943,262
Patented June 28, 1960

2,943,262

PULSE ANALYZER

John D. Ball, Houston, Tex., assignor, by mesne assignments, to Jersey Production Research Company, Tulsa, Okla., a corporation of Delaware Filed Oct. 28, 1957, Ser. No. 692,948

7 Claims. (Cl. 328—115)

This invention relates to pulse height analyzers. More particularly, this invention is a pulse height analyzer utilizing a single channel for the measurement of the pulse height distribution of a plurality of pulses having different voltage levels.

Pulse height analyzers are used for a variety of purposes, such as the measurement of the pulse height distribution of pulses received from radiation detectors. One type of analyzer currently used includes a plurality of analyzing channels. The pulses are fed to each of the channels. Each channel includes therein a vacuum tube or tubes which are biased to pass pulses having a voltage level above a predetermined level. The bias of each electronic tube is different from the bias of the tubes in the other channels. All of the pulses which have a voltage level above the predetermined level in a particular channel are registered in a register included in said channel. The number of pulses between two voltage levels is determined by subtracting the number of pulses above one voltage level from the number of pulses above the next lower voltage level.

The foregoing type of analyzer has the disadvantages that a plurality of channels are necessary, resulting in an excessive number of electrical components when a large variety of pulses are being measured simultaneously and the number of pulses in a particular voltage level are not indicated directly, the subtracting procedure being necessary to determine the number of pulses in the particular voltage level.

A second type of analyzer currently used includes a selector for varying the bias upon the channel. Here again, the number of pulses registered consists only of those pulses above a predetermined voltage level. The number of pulses within a particular voltage level is not registered directly.

A pulse height analyzer which utilizes only one channel for measuring the number of pulses of a plurality of pulses which are in each particular voltage level is highly desirable. Such a pulse height analyzer is even more desirable and advantageous if the number of pulses within each voltage level is indicated directly.

It is an object, therefore, of this invention to provide an analyzer which requires only one channel for the measurement of a plurality of pulses of different voltage levels.

It is a further object of this invention to provide an analyzer which indicates the number of pulses in each voltage level directly.

Briefly described, this invention includes a holding circuit, a comparing circuit, a storage circuit, and a stairstep voltage generating circuit. The holding circuit receives each input pulse and maintains an output voltage level for a time sufficiently long to determine the voltage level of the input pulse. The holding circuit output voltage is fed to the comparing circuit. A stair-step voltage from the stair-step generating circuit is also fed to the comparing circuit. When the stair-step voltage level is at a particular level representative of the voltage level of the input pulse, the comparing circuit produces a signal which is fed to the storage circuit. The storage circuit includes a plurality of indicators, which may be digital or analogue, with each indicator being controlled by a gate which remains open only for a period of time sufficient to indicate the presence of a particular voltage level which is different from the voltage level at which any of the other gates are maintained open.

The gates may be controlled by the same stair-step voltage which is fed to the comparing circuit so that each gate is open only at the same voltage level as the stair-step voltage level fed to the comparing circuit. By this means only the pulses which are at a particular voltage level are registered by a particular indicator. After each pulse height is indicated, a resetting signal is fed to the holding circuit to reset the holding circuit to its initial condition preparatory to the receipt of the next pulse to be measured. The resetting signal may be controlled by the stair-step voltage generator.

A better understanding of this invention may be had by reference to the following description and drawings in which.

Figure 1:
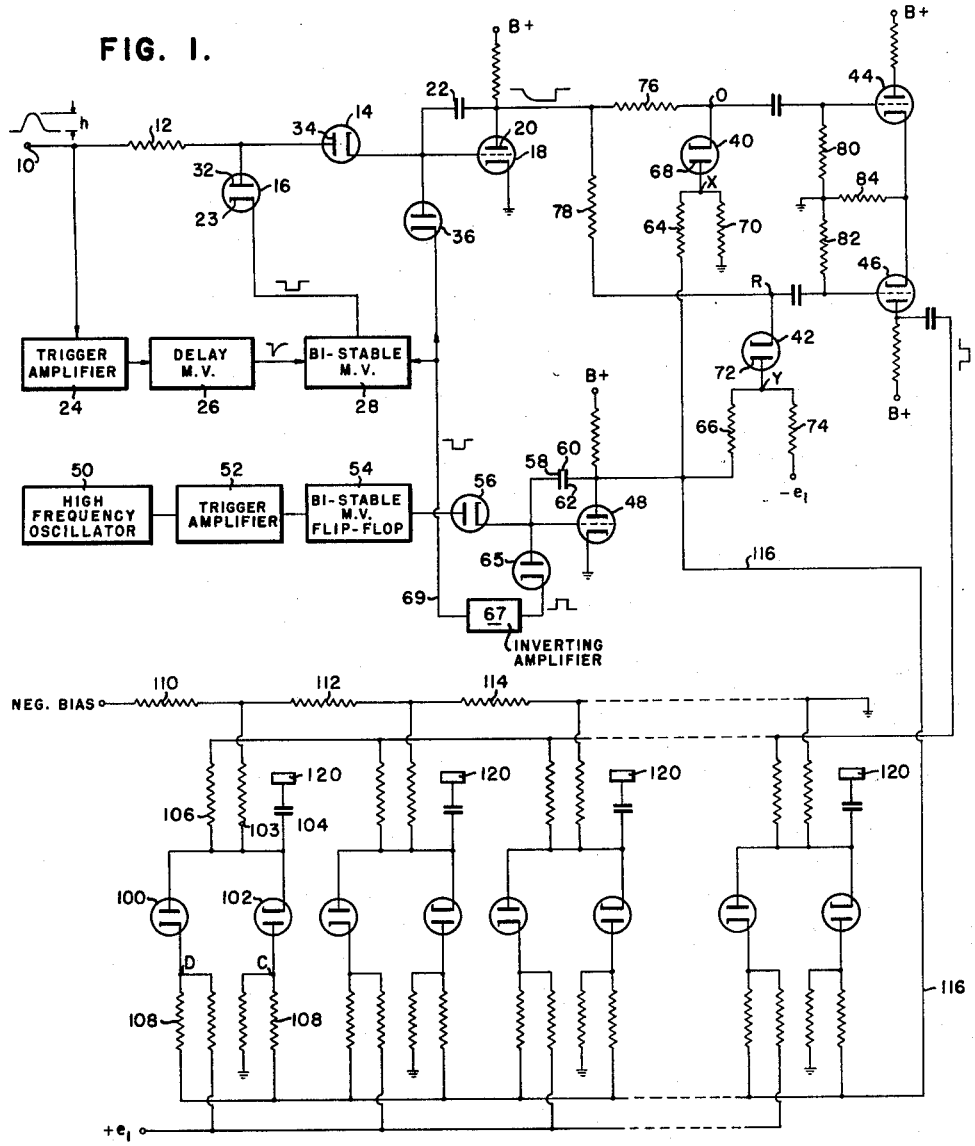
Fig. 1 is a diagram partially in block form and partially schematic illustrating one embodiment of the invention.

Referring to Fig. 1, the pulses to be measured are fed from terminal 10 through resistor 12 to the plates of diode tubes 14 and 16. Diode 14 is of the high back-resistance type and serves as a charge diode. Since the pulse is of positive polarity, the charge tube 14 is made conductive so that the grid-to-cathode voltage of triode tube 18 is made more positive. This decreases the voltage at the plate 20 of triode 18 and a charge is built up in capacitor 22. Diode 36 remains non-conductive until a negative pulse is applied to the cathode of diode 36.

The pulses to be measured do not rise directly from a zero voltage to a higher voltage level; the rise occurs over a finite time. Therefore, it is necessary to maintain charge diode 14 in operation for a period of time sufficient to permit the rise time to occur. This is accomplished by diode 16 which is held non-conductive until a negative voltage is applied to its cathode 23. The application of the negative voltage is delayed for a period of time sufficient to permit a maximum rise time of the pulses to occur and the capacitor 22 to become fully charged. Diode 16 may be called a "hold off" gate and the negative pulse applied to its cathode may be called the "hold off" pulse.

Figure 2:
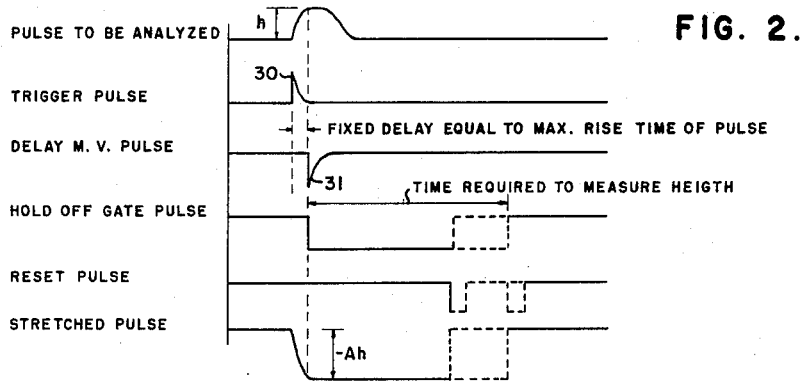
Fig. 2 is a graph useful in explaining the operation of the holding circuit of Fig. 1.

The delay in application of the hold off pulse to cathode 23 of diode 16 is accomplished by means of trigger amplifier 24, delay multivibrator 26, and bi-stable multivibrator 28. The trigger amplifier, delay multivibrator, and bi-stable multivibrator are of conventional design. The function of these circuits may be better understood by reference to Fig. 2. The pulse to be analyzed having a pulse height "h" is fed to the trigger amplifier 24 which emits a trigger pulse 30. After a fixed delay equal to the maximum rise time of the pulses to be analyzed, the delay multivibrator emits a pulse 31 which is fed to bi-stable multivibrator 28. Bi-stable multivibrator 28 is changed to its lower voltage stable state by the application of pulse 31. The output of bi-stable multivibrator 28 is connected to cathode 23. Hence, the cathode 23 of diode 16 is made more negative by the application of trigger pulse 31 to multivibrator 28.

The pulse from multivibrator 28 causes diode 16 to become conductive, thus making plate 32 less positive as well as plate 34 of diode 14 so that diode 14 becomes non-conductive, preventing a second pulse from being applied until the "hold off" is released. Since there is no closed circuit to discharge capacitor 22, the grid to cathode voltage of triode 18 remains the same, thus maintaining the output voltage of the holding circuit the same until the capacitor 22 is discharged. The output voltage from the plate of triode 18 is kept for a period of time sufficient to permit the measurement of the height of the holding circuit output pulse in a manner to be subsequently described.

After the output pulse has been measured and registered, the capacitor 22 is discharged by means of a negative pulse fed to the cathode of discharge diode 36. The holding circuit is then ready to measure the pulse height of the next pulse input.

The plate voltage of triode 18 is connected to a comparing circuit including diodes 40 and 42, and triodes 44 and 46. The plate voltage from triode 18 is compared in the comparing circuit with a voltage in the plate circuit of a triode tube 48 comprising part of a stair-step generating circuit to be subsequently described.

Figure 3:
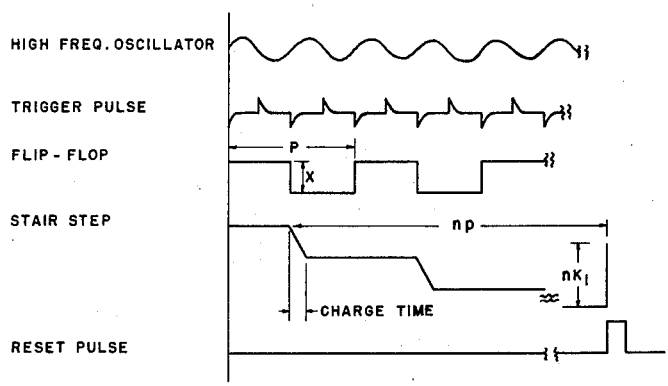
Fig. 3 is a graph useful in explaining the operation of the stair-step voltage generator of Fig. 1.

The stair-step generating circuit includes a high-frequency oscillator 50, a trigger amplifier 52, and a bi-stable multivibrator flip-flop circuit 54. Trigger amplifier 52 emits a trigger pulse each time the signal from the oscillator 50 crosses the zero line from one voltage polarity to another voltage polarity, a positive trigger pulse being emitted as the oscillating signal goes from positive voltage to negative voltage, and a negative trigger pulse being emitted when the oscillating signal goes from a negative polarity to a positive polarity. This is clearly illustrated in the graphical representation of Fig. 3. The bi-stable flip-flop circuit 54 is changed from one stable state to the other stable state upon receipt of a negative pulse from trigger amplifier 52.

When the flip-flop voltage swings to a more positive voltage, the charge diode 56 becomes conductive. Triode 48 also conducts and a negative charge with respect to plate 58 is put on plate 62 of a capacitor 60. Upon the negative swing of flip-flop circuit 54, the charge diode becomes non-conductive.

Diode 65 is normally non-conductive and is of the type that will not become conductive until a certain predetermined positive charge is put on plate 58 of capacitor 60. Hence, the charges remain on capacitor 60 until diode 65 becomes conductive. On the next positive upswing of the flip-flop voltage, plate 58 becomes more positively charged and plate 62 becomes charged more negatively. Therefore, the plate voltage of triode 48 decreases in incremental voltage steps. After a predetermined number of stair-stepping voltages, the charge on plate 58 becomes sufficiently positive to cause discharge diode 65 to conduct. When diode 65 begins to conduct, the capacitor 60 is discharged and returned to its initial state to begin the cycle over again.

The discharge through discharge diode 65 is conducted through line 69 and inverting amplifier 67 to the cathode of diode 36 and to the bi-stable multivibrator 28. The overall period of the stair-stepping voltage is set so that a sufficiently long period exists to permit the pulse height measurement of the expected voltage levels of the input pulses.

The stair-step voltage from the stair-step voltage generating source is fed to the plates of diodes 40 and 42 through resistors 64 and 66, respectively. Plate 68 of diode 40 is also connected to ground through resistor 70. The plate 72 of diode 42 is connected to a negative bias through resistor 74. The negative bias applied to plate 72 of diode 42 is equal to the difference between the adjacent levels of the stair-step voltage from the voltage generating source.

The plate voltage from triode 18 of the holding circuit is fed to the cathodes of diodes 40 and 42 of the comparing circuit through resistors 76 and 78, respectively. Resistors 76 and 78 are much greater in magnitude than resistors 64, 70, 74, and 66 in the plate circuits of diodes 40 and 42.

If junction "X" is more positive than the holding circuit output, pulse diode 40 will conduct, making junction "O" positive. If the holding circuit output pulse is sufficiently negative to make diode 42 conduct also, then junction "R" will also be positive. Triodes 44 and 46 with their resistors 80, 82, and 84 constitute a differential amplifier which will have no output if both inputs have the same signal applied. Therefore, an output from the plate circuit of triode 46 is obtained only when the holding circuit output voltage causes diode 40 to conduct but not diode 42.

From the foregoing explanation it is seen that if the initial voltage of the stair-step voltage is zero and a negative pulse is applied to the cathodes of diodes 40 and 42 from the plate circuit of triode 18, both diodes 40 and 42 conduct and there is no output from the plate circuit of triode 46. Since the stair-step voltage magnitude increases in the negative direction, a point will be reached at which the plate 68 of diode 40 becomes negative with respect to junction "O." However, since the plate 72 of diode 42 is negatively biased by a negative bias which is equal to an incremental step of the stair-step voltage, diode 40 will conduct before diode 42 begins to conduct. At this point, an output pulse will be obtained from the plate of triode 46. As the stair-step voltage continues to increase in magnitude in the negative direction, diode 42 conducts and no output is obtained from the triode 46. Hence, a single pulse is obtained from the plate circuit of triode 46 when the stair-step voltage reaches a level representative of the voltage level of the particular pulse whose height is being measured.

Figure 4:
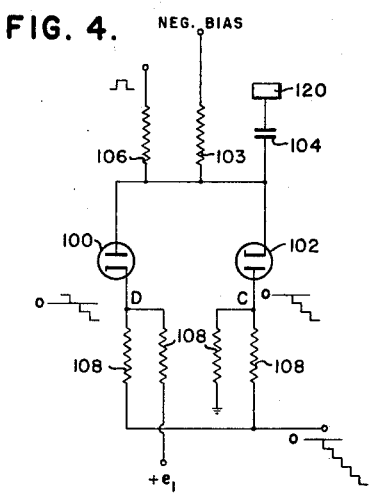
Fig. 4 is an electrical schematic diagram illustrating a portion of the storage circuit shown in Fig. 1.

The manner in which the storage circuit operates is best explained by reference to Fig. 4 which shows one gate circuit for one register. Fig. 4 represents a portion of the storage circuit shown in Fig. 1.

Each gating circuit includes a pair of diodes 100 and 102. The cathode of diode 100 is positively biased with respect to the plate of diode 102 by one step "$e_1$" equivalent to one step of the stair-step generated voltage. The plate of diode 102 and cathode of 100 are connected to the stair-step voltage through resistors 108. A negative bias is applied to the plate of diode 100 and the cathode of 102 through a resistor 103. As long as junction "C" is positive with respect to the negative bias, diode 102 conducts and no charge is placed on the capacitor 104. When junction "C" is equal in potential to the negative bias applied to the cathode, diode 102 becomes non-conductive, and since diode 100 is also non-conductive because its cathode is positively biased, the capacitor 104 will become charged if a signal is received at that time from the comparing circuit through resistor 106. The received signal is passed to a register such as a digital recorder 120, or in the alternative, an analog recorder.

The next stair-step after diode 102 becomes non-conductive, the potential at junction "D" will be equal to the potential at the plate of diode 100, and diode 100 will become conductive. Thereafter no charge is placed on capacitor 104. Hence, a pulse is passed to the register of this gating circuit only if it is received when the stair-step generated voltage is at a particular voltage level. This voltage level represents a particular voltage level of the measured input pulse from terminal 10 (see Fig. 1).

Resistors 103 and 106 are of a much greater magnitude than resistors 108 in the cathode and plate circuits of diodes 100 and 102, respectively. Also, the pulse from the comparing circuit is held to a height (h) less than one stair-step at the "C" and "D" junctions.

Referring again to Fig. 1, it is seen that the storage circuit includes a plurality of gating circuits similar to that shown in Fig. 4. However, each gating circuit is negatively biased by a different negative bias applied by means of a voltage divider, including resistors 110, 112, and 114. Since all of the gating circuits are similar to the gating circuit described and operate in the same manner except for the different negative bias applied to each gating circuit, the description of the operation of the remaining circuits is deemed unnecessary.

As each stair-step voltage is fed through line 116 to the storage circuit, the gating circuits open sequentially, and each remains open for one stair-step peirod and then closes. If a singal is received from the comparing circuit, it will be registered in one of the registers 120 according to the particular voltage level of the input pulse, the height of which is being determined. Hence, all of the pulses having a particular voltage level are directly registered in one of the registers 120, and the computational steps currently required in other pulse height analyzing systems is eliminated.

Figure 5:
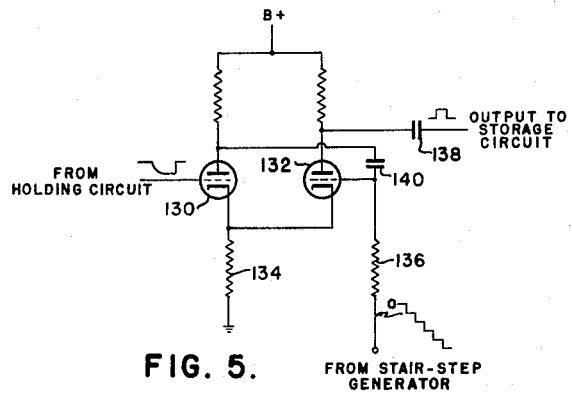
Fig. 5 is an electrical schematic diagram showing a second type of comparing circuit which may be used in place of the comparing circuit shown in Fig. 1.

A second type of comparing circuit which may be substituted for the diodes 40 and 42 and triodes 44 and 46 shown in Fig. 1 is shown in Fig. 5. A modified Schmitt trigger circuit is used, including triodes 130 and 132. The cathodes of triodes 130 and 132 are connected to a common resistor 134, which is grounded. The grid of triode 130 receives the signal from the holding circuit, and the grid of triode 132 receives the stair-step voltage from a stair-step voltage generator through resistor 136. The plate voltage from triode 132 is fed to the storage circuit through capacitor 138. The application of the negative voltage from the holding circuit to the grid of triode 130 causes the plate of triode 130 to swing positively, thus causing the grid of triode 132 to become positive due to the charging of capacitor 140. As the magnitude of the stair-step generator voltage increases in the negative direction, the potential of the grid of tube 132 becomes less and less positive, until the voltage from the stair-step generator is the same as the voltage from the holding circuit to the grid of 130, at which time the grid of triode 132 becomes negative. At this point, triode 132 ceases to conduct and a positive pulse is fed from the plate circuit of triode 132 to the storage circuit.

To describe the operation of the complete system, refer to Fig. 1. Assume the holding circuit has just been reset and an input pulse has been fed to the holding circuit. A holding circuit output pulse is held in the circuit for a period of time sufficient to permit the measurement of its voltage level. The stair-step voltage is fed to the comparing circuit and also fed through line 116 to the storage circuit. The gating circuits of the storage circuit are opened sequentially in response to a particular stair-step voltage level. Each gating circuit is held open only when the stair-step voltage is at the particular voltage level for the particular gating circuit. The gating circuit then remains closed until the same voltage level is again received. When the stair-step voltage level is obtained which is representative of the voltage level of the input pulse, a pulse is fed from the plate of triode 46 in the comparing circuit and is registered on the register whose gating circuit is open at that time.

After a predetermined number of stair-step voltages, which number is chosen so that the maximum magnitude in the negative direction is greater than the maximum magnitude of the pulses to be measured, the reset pulse is fed through diode 65 in the voltage generating circuit and inverting amplifier 67 to the bi-stable multivibrator 28 and the cathode of diode 36 in the holding circuit to discharge the capacitor 22 in the holding circuit and reset the holding circuit to receive the next pulse. The reset pulses are always of the same height and duration so that the capacitor 22 is discharged the same amount at each resetting. The analyzer is now ready to measure the height of the next incoming pulse through terminal 10 and the cycle repeated.

From the foregoing, it is seen that the analyzer utilizes only one input terminal instead of the many input terminals and separate channels having a different bias required in currently utilized analyzers. Also, the number of pulses registered on each register in the storage circuit gives a direct indication of the number of pulses having a particular voltage level.

It is to be understood that various modifications may be made without departing from the scope of this invention.

I claim:

1. A pulse height distribution analyzer comprising: a holding circuit for receiving an input pulse and producing a holding circuit output pulse of substantially constant magnitude, said magnitude being representative of the height of the input pulse; means for producing a stair-step voltage; a comparing circuit for comparing the holding circuit output pulse with the stair-step voltage and adapted to produce a signal when the stair-step voltage reaches a level representative of the voltage level of said input pulse; and means responsive to said signal to indicate the magnitude of said input pulse.

2. A pulse height distribution analyzer comprising: a holding circuit for receiving an input pulse and producing an output pulse of substantially constant magnitude, said magnitude being representative of the height of the input pulse; a stair-step voltage generating circuit adapted to make step-wise voltage changes from an initial voltage to a final voltage and then return to the initial voltage; a comparing circuit for continuously comparing the holding circuit output pulse with the stair-step voltage and adapted to produce a signal when the stair-step voltage reaches a level representative of the voltage level of said input pulse; means responsive to said signal to indicate the magnitude of said input pulse; and means for conducting a resetting pulse to the holding circuit.

3. A pulse height distribution analyzer comprising: a holding circuit for receiving an input pulse and maintaining an output voltage level representative of the height of the input pulse for a time sufficiently long to determine the voltage level of said input pulse; a comparing circuit; a storage circuit including a plurality of indicators, one for each possible voltage level of input pulse; and a stair-step voltage generating circuit electrically connected to the holding circuit, the comparing circuit, and the storage circuit and adapted to feed a stair-step voltage to the comparing circuit and storage circuit, and a resetting signal to the holding circuit whereby the height of said pulse is indicated and the holding circuit reset.

4. A pulse height distribution analyzer comprising: a holding circuit for receiving a pulse and maintaining an output voltage representative of the height of the input pulse for a time sufficiently long to determine the voltage level of said input pulse; a comparing circuit for comparing the holding circuit output voltage with a stair-step voltage and producing a signal when the stair-step voltage reaches a level representative of the voltage level of said input pulse; a storage circuit including a plurality of indicators, each including a gate which remains open only while receiving a particular voltage different from that received by any other gate; and a stair-step voltage generating circuit electrically connected to the holding circuit, the comparing circuit, and the storage circuit and adapted to feed a stair-step voltage to the comparing circuit and storage circuit and then a resetting signal to the holding circuit whereby the height of said pulse is indicated and the holding circuit reset.

5. A pulse height distribution analyzer comprising: a holding circuit for receiving a pulse and maintaining an output voltage representative of the height of the input pulse for a time sufficiently long to determine the voltage level of said input pulse; a comparing circuit for comparing the holding circuit output voltage with a stair-step voltage and producing a signal when the stair-step voltage reaches a level representative of the voltage level of said input pulse; a storage circuit including a plurality of indicators, each including a gate which remains open only while receiving a particular voltage different from that received by any other gate; a stair-step voltage generating circuit including a capacitor which is charged in steps to provide the stair-step voltage; means for conducting said stair-step voltage to the comparing and storage circuits so that the height of said pulse is indicated; and means responsive to a predetermined number of stair-step voltage steps for discharging the capacitor and resetting the holding circuit.

6. A pulse height distribution analyzer comprising: a holding circuit for receiving each pulse and including a vacuum tube responsive to said pulse to produce an output voltage; means for maintaining said output voltage at a level representative of the height of said pulse after the pulse has been received; a comparing circuit for comparing the holding circuit output voltage with a stair-step voltage and producing a signal when the stair-step voltage reaches a level representative of the voltage level of said input pulse; a storage circuit including a plurality of indicators, each including a gate which remains open only while receiving a particular voltage different from that received by any other gate; a stair-step voltage generating circuit including a capacitor which is charged in steps to provide the stair-step voltage; means for conducting said stair-step voltage to the comparing and storage circuits so that the height of said pulse is indicated; means responsive to a predetermined number of stair-step voltage steps for discharging the capacitor; and means for conducting the discharge signal to the holding circuit to reset the vacuum tube to its initial state.

7. A pulse height distribution analyzer for measuring the heights of pulses including pulses having a finite rise time comprising: a holding circuit for receiving an input pulse and producing a holding circuit output pulse; a hold off circuit operating, first, to permit the input pulse to be fed to the holding circuit until the maximum height of the input pulse is obtained; and, second, to thereafter prevent the feeding of a signal to the holding circuit until after the maximum height of the input pulse is indicated; means for producing a stair-step voltage; a comparing circuit for comparing the holding circuit output pulse with the stair-step voltage and adapted to produce a signal when the stair-step voltage reaches a level representative of the voltage level of said input pulse; and means responsive to said signal to indicate the magnitude of said input pulse.

References Cited in the file of this patent

UNITED STATES PATENTS

| | | |
|---|---|---|
| 2,227,052 | White | Dec. 31, 1940 |
| 2,743,359 | Sayre | Apr. 24, 1956 |
| 2,759,998 | Labin et al. | Aug. 21, 1956 |
| 2,796,314 | Bishop et al. | June 18, 1957 |